(12) United States Patent
Szuszczewicz et al.

(10) Patent No.: US 8,306,203 B1
(45) Date of Patent: Nov. 6, 2012

(54) METHOD AND COMPUTER-READABLE MEDIUM FOR TERMINATING OPTIONS FOR DISPATCH GROUP CALLS

(75) Inventors: Karalyn M. Szuszczewicz, Haymarket, VA (US); Trinh D. Vu, Ashburn, VA (US); Jeffrey Scott Posner, Bethesda, MD (US)

(73) Assignee: Nextel Communications, Inc.

( * ) Notice: Subject to any disclaimer, the term of this patent is extended or adjusted under 35 U.S.C. 154(b) by 1669 days.

(21) Appl. No.: 11/449,841

(22) Filed: Jun. 9, 2006

Related U.S. Application Data

(60) Provisional application No. 60/689,078, filed on Jun. 10, 2005.

(51) Int. Cl.
*H04M 3/42* (2006.01)

(52) U.S. Cl. ......... 379/201.01; 379/142.01; 379/202.01; 379/220.01; 370/260; 455/416; 455/518; 455/521

(58) Field of Classification Search .............. 370/94.1, 370/260; 379/220.01, 142.01, 201.01, 202.01; 455/416, 422, 518, 521
See application file for complete search history.

(56) References Cited

U.S. PATENT DOCUMENTS

| | | | |
|---|---|---|---|
| 5,115,233 A * | 5/1992 | Zdunek et al. | 370/348 |
| 6,781,963 B2 * | 8/2004 | Crockett et al. | 370/260 |
| 6,873,854 B2 * | 3/2005 | Crockett et al. | 455/518 |
| 6,898,436 B2 * | 5/2005 | Crockett et al. | 455/518 |
| 2003/0059023 A1 * | 3/2003 | Crockett et al. | 379/220.01 |

* cited by examiner

*Primary Examiner* — Khai N Nguyen

(57) ABSTRACT

When an ad hoc group call is initiated, or at a subsequent time but before the group call is terminated, a call originator may set a parameter to establish a time limit. The time limit is invoked when the call originator drops from the group call. The time limit may be set to zero time indicating that all participants will be disconnected and the group call will be terminated immediately upon exit of the call originator. The time limit may also be set to a predetermined amount of time, which indicates that the group call may remain up until the predetermined amount of time expires. If no parameter to establish a time limit is selected, the group call may remain indefinitely even after the originator exits the group call.

6 Claims, 3 Drawing Sheets

METHOD AND COMPUTER-READABLE MEDIUM FOR TERMINATING OPTIONS FOR DISPATCH GROUP CALLS

CROSS REFERENCE TO RELATED APPLICATIONS

The present application claims priority under 35 U.S.C. §119 from U.S. Provisional Patent Application No. 60/689,078, which was filed on Jun. 10, 2005, the disclosure of which is incorporated herein by reference.

BACKGROUND OF THE INVENTION

Some wireless communication networks, such as the iDEN network owned and operated by Sprint Nextel Communications, Inc., can provide two different types of voice communications services, i.e., interconnect and dispatch. An interconnect communication is what is conventionally considered "cellular communications," while a dispatch communication is commonly known as a walkie-talkie or push-to-talk (PTT) type of call such as Sprint Nextel's service identified by the trade name Direct Connect.

Dispatch calls can be private calls or group calls. A dispatch private call is between two dispatch stations, and a dispatch group call is between more than two dispatch stations.

Qualcomm Incorporated provides a dispatch communication service known as QChat for use in 3G CDMA networks, for example. QChat uses standard voice-over Internet Protocol (VoIP) technologies, in which voice information is sent in a digital form in data packets over IP-based data networks. QChat allows end users to set up ad hoc group calls from a handset. To make an ad hoc group call, a user selects all of the invitees from a user interface on the handset and presses a dispatch call button to initiate the call. One problem with the current QChat system for terminating ad hoc group calls is that it allows a call to continue after the originator of the call drops from the call. This can result in unbounded financial liability to the originator. The present invention addresses this problem by providing termination options.

SUMMARY OF THE INVENTION

In accordance with exemplary embodiments of the present invention, when an ad hoc group call is initiated, or at a subsequent time but before the call is terminated, the originator may set a parameter to establish a time limit. The time limit is invoked when the originator drops from the call. The time limit may be set to zero time, indicating that all participants will be disconnected and the call will be terminated immediately upon exit of the originator. The time limit may also be set to a time greater than zero to allow the group call to continue for a predetermined amount of time. If the originator does not select a time limit for a termination option, the call may remain up indefinitely even after the originator exits the call.

Other objects, advantages and novel features of the present invention will become apparent from the following detailed description of the invention when considered in conjunction with the accompanying drawings.

DETAILED DESCRIPTION OF THE EXEMPLARY EMBODIMENTS

One feature of dispatch communications is talk groups. A talk group is a number of different communication stations which can be joined into a single communication session by dialing a single call identifier (i.e., a closed group call) or by selecting a group of invitees and dialing a dispatch call (i.e., an ad hoc group call). As used herein, the term communication stations includes both wired and wireless communication stations. Talk group communication sessions are highly desired by public safety agencies, because of the simplicity of setting up a communication session between, and communicating with, a number of communication stations.

Figure 1:
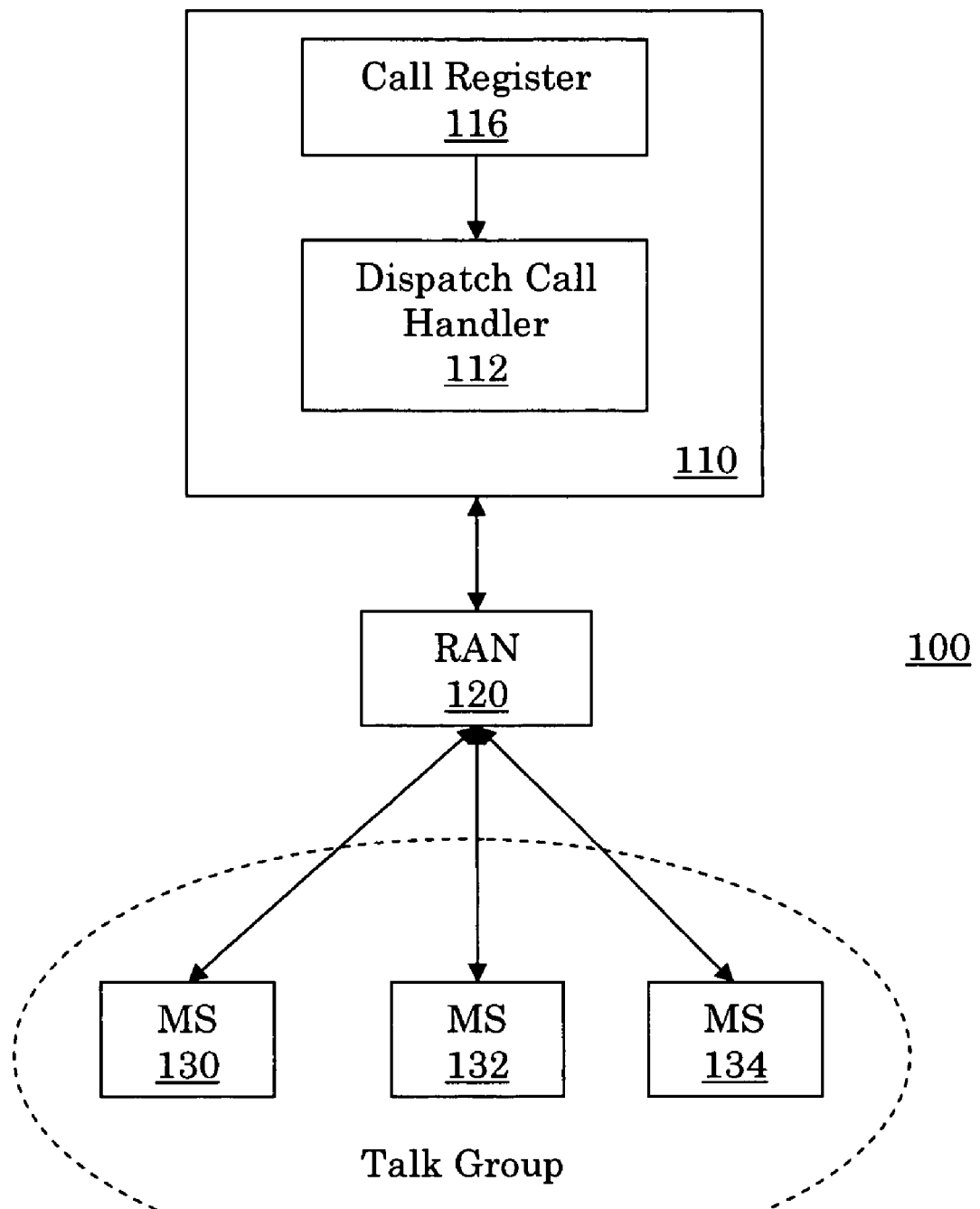
FIG. 1 illustrates an exemplary publicly-accessible communication network, which supports talk group dispatch communications, in accordance with an embodiment of the present invention.

FIG. 1 illustrates an exemplary publicly-accessible communication network 100, which supports talk group dispatch communications, in accordance with one embodiment of the present invention. The network 100 includes a dispatch area network subsystem 110, a radio access network (RAN) 120, and a number of communication stations (e.g., mobile stations (MS)) 130, 132, and 134. A dispatch area is a geographic area which includes two or more cells that share network subsystems, such as mobile switching centers (MSCs) and location registers. The dispatch area network subsystem 110 includes a dispatch call handler 112 and a call register 116. The call register 116 generally operates in a similar manner to a location register and performs the functions of a home location register (HLR) to register and authenticate the user. Each dispatch call handler generally operates in a similar manner to a mobile switching center/visitor location register (MSC/VLR) or dispatch application processor (DAP).

Initially, an originator selects two or more recipients for an ad hoc group call or an ID of a closed group call. Next, the originator indicates via the user interface (UI) if the call can remain up after the originator departs and if there is a specific amount of time other participants may use the call after the originator departs, or if the call should be terminated immediately upon departure by the originator. The user interface may include a keyboard and screen on a mobile station.

Figure 2:
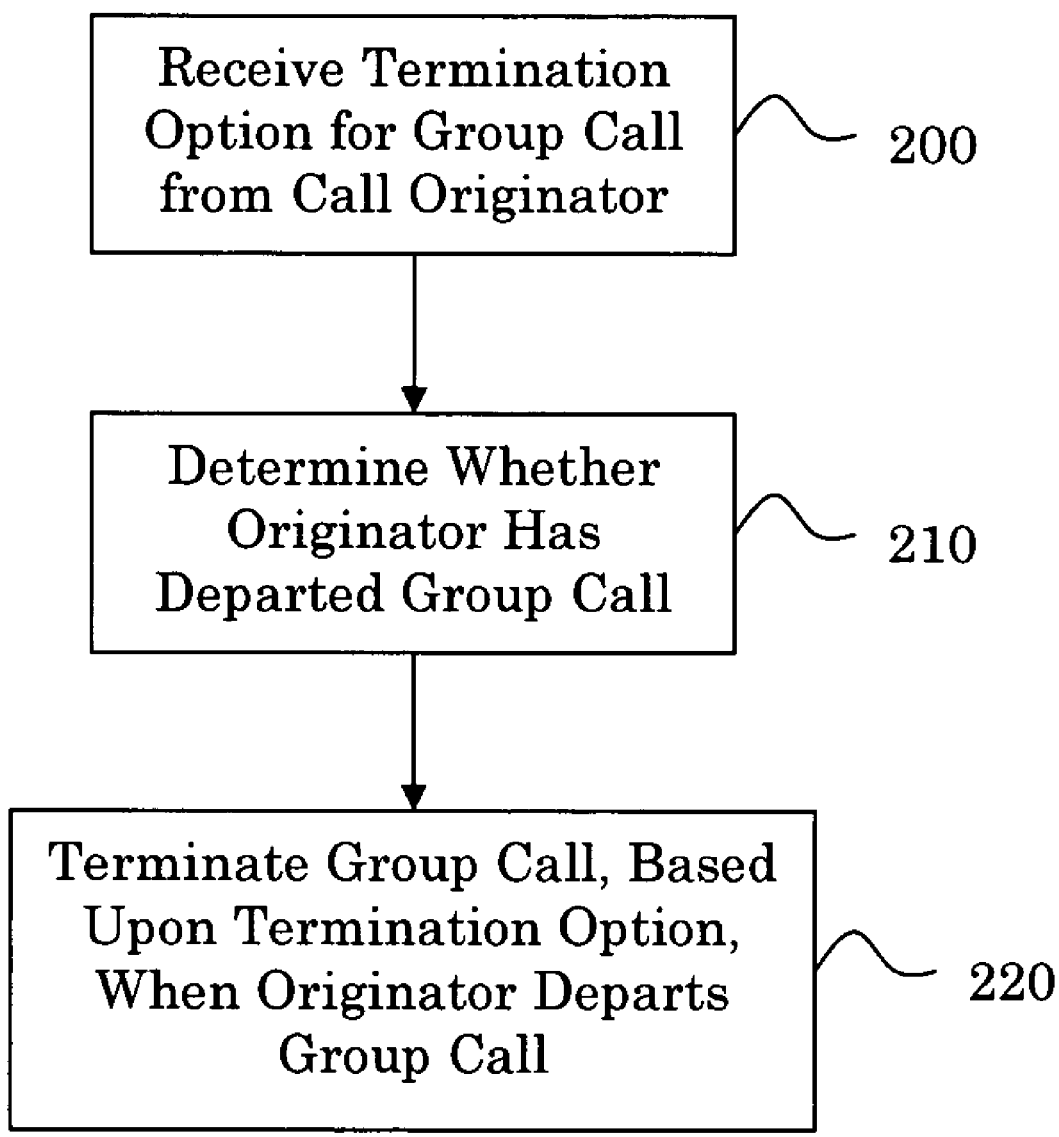
FIG. 2 illustrates an exemplary embodiment of a method for terminating a group call, in accordance with the present invention.

FIG. 2 illustrates an exemplary embodiment of a method for terminating a group call, in accordance with the present invention. In step 200, a termination option for a group call is received by a dispatch area network subsystem from a call originator. For example, the call originator may enter the termination option via the user interface on his mobile station. Termination options may include, for example, "no termination," "immediate termination" and "timed termination." The choice of termination option may be determined based upon menus available to the call originator on his handset from which the desired termination option may be selected. Alternatively, the call originator may enter a numeric, alphabetical or alphanumeric code via the user interface, which corresponds to the desired termination option. Also, the call originator may modify termination options while the call proceeds in the same manner as the termination options are originally entered.

The dispatch area network subsystem, which monitors the group call, determines in step 210 whether the call originator has departed the call prior to a tear down of the call. When the originator departs the group call, the group call is terminated, in step 220, based upon the termination option received from the call originator.

Figure 3:
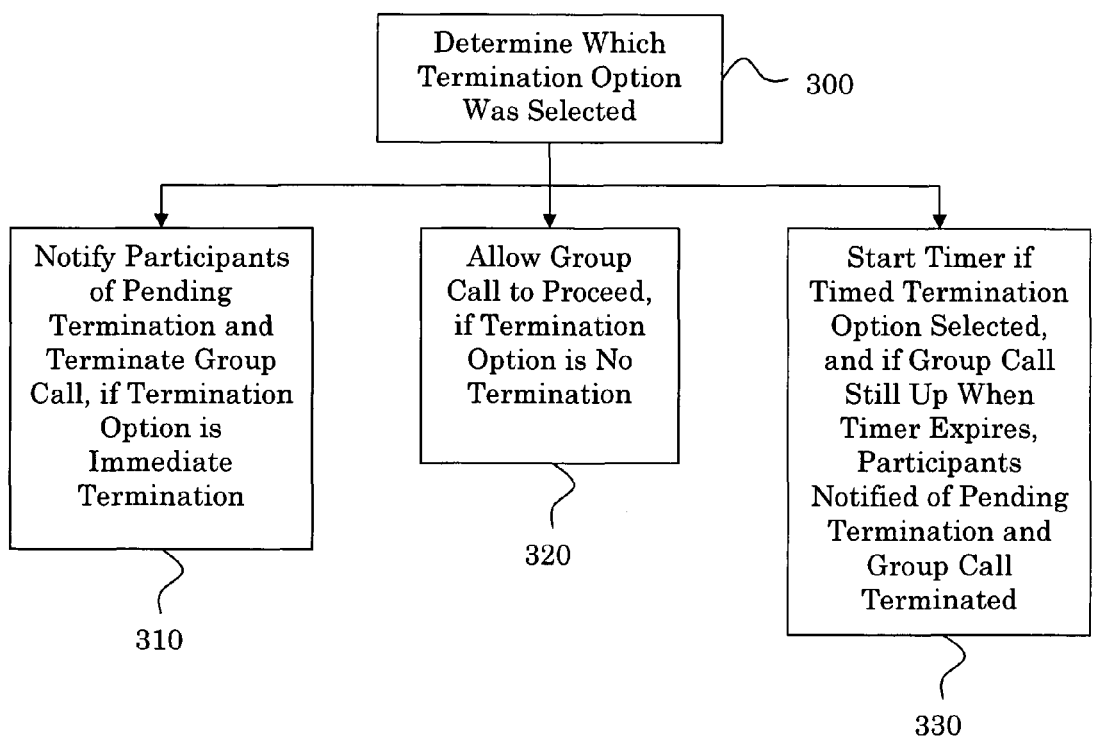
FIG. 3 illustrates another exemplary embodiment of a method for terminating a group call, in accordance with the present invention.

FIG. 3 illustrates another exemplary embodiment of a method for terminating a group call, in accordance with the present invention. In step 300, the termination option selected by the call originator is determined. If the "immediate termination" option was selected, when the originator departs the call, the participants are notified of the pending termination and the group call is terminated in step 310. In step 320, if the "no termination" option was selected, when the originator departs the call the group call is allowed to proceed until it is torn down. If the call originator selected a termination option other than "immediate termination" or "no termination," (e.g., "timed termination") a timer starts counting down from a maximum time in step 330, and if the group call is still up when the timer expires, participants are notified of the pending termination and the group call is terminated. The timer may be set to any value by the call originator. As described above, the call originator may choose to have the group call that he originated terminate immediately upon his departure from the call, allow the call to continue until torn down, or terminate the call a predetermined amount of time after the call originator departs the call.

In another exemplary embodiment of the present invention, there is a computer-readable medium encoded with a computer program for terminating a group call when a call originator departs the group call. The term "computer-readable medium" as used herein refers to any medium that participates in providing instructions for execution. Such a medium may take many forms, including but not limited to, non-volatile media, volatile media, and transmission media. Non-volatile media includes, for example, optical or magnetic disks. Volatile media includes, for example, dynamic memory. Transmission media includes coaxial cables, copper wire and fiber optics. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave, or any other medium from which a computer can read.

Exemplary embodiments of a computer-readable medium encoded with a computer program for terminating a group call when a call originator departs the group call are illustrated in FIGS. 2 and 3, which are described above.

Although exemplary embodiments of the present invention have been described in connection with QChat, the systems, methods and techniques described herein can also be employed in other types of dispatch communication systems.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for terminating a group call based upon a termination option, comprising:
    establishing, by a dispatch area network subsystem of a communications system, the group call based on a group call request from a communication station;
    receiving, by a dispatch area network subsystem, a termination option for terminating the group call from the communication station comprising a time limit set by the communication station;
    notifying, by the dispatch area network subsystem, the participants of the group call of a pending termination and terminating the group call, when the communication station departs the group call and the time limit set by the communication station comprises zero;
    maintaining, by the dispatch area network subsystem, the group call, when the communication station departs the group call and the time limit set by the communication station comprises a code indicating that the call is not to be terminated when the communication station departs the group call;
    starting a timer, by the dispatch area network subsystem, when the time limit set by the communication station comprises a predetermined time limit;
    maintaining, by the dispatch area network subsystem, the group call for the predetermined time limit, when the communication station departs the group call and the time limit set by the communication station comprises the predetermined time limit; and notifying, by the dispatch area network subsystem, the participants of the group call of pending termination and terminating the group call, when the communication station departs the group call, the time limit set by the communication station comprises the predetermined time limit, and the timer expires.

2. The method of claim 1, wherein the communications system comprises a voice over internet protocol network and the group call is established over the voice over internet protocol network.

3. The method of claim 1, further comprising:
    receiving, by the dispatch area network subsystem, a second termination option for terminating the group call from the communication station comprising a second time limit set by the communication station,
    wherein the second termination option replaces the previously-received termination option.

4. A non-transitory computer-readable medium encoded with a computer program executable by a processor of a dispatch area network subsystem of a communications system to terminate an established group call, based upon a termination option comprising a time limit, when an originating communication station departs the group call, the computer program comprising instructions to:
    notify participants of the group call of a pending termination and terminating the group call, when the originating communication station departs the group call and the time limit set by the originating communication station comprises zero;
    maintain the group call, when the originating communication station departs the group call and the time limit set by the originating communication station comprises a code indicating that the call is not to be terminated when the originating communication station departs the group; and
    starting a timer counting down from a predetermined time limit set by the originating communication station, when the originating communication station departs the group call and the time limit set by the originating communication station comprises the predetermined time limit, wherein, when the group call is still up when the timer expires, the participants are notified of a pending termination and the group call is terminated.

5. The non-transitory computer-readable medium of claim 4, wherein the communications system comprises a voice over internet protocol network and the group call is established over the voice over internet protocol network.

6. The non-transitory computer-readable medium of claim 4, the computer program further comprising:
 replacing a current termination option for terminating the group call with a second termination option for terminating the group call comprising a second time limit set by the originating communication station, when receiving the second termination option from the originating communication station.

\* \* \* \* \*